United States Patent
Saltzman et al.

(10) Patent No.: US 10,659,543 B2
(45) Date of Patent: May 19, 2020

(54) SYSTEM AND METHODS FOR TRACKING THE USAGE OF DIGITAL SERVICES

(71) Applicant: Toluna Israel, Haifa (IL)

(72) Inventors: Roi Saltzman, Herzliya (IL); Frank Smadja, Haifa (IL); Ido Azran, Tel-Aviv (IL); Yizhaq Ben Yosef, New York, NY (US)

(73) Assignee: Toluna Israel Limited, Haifa (IL)

( * ) Notice: Subject to any disclaimer, the term of this patent is extended or adjusted under 35 U.S.C. 154(b) by 27 days.

(21) Appl. No.: 15/724,642

(22) Filed: Oct. 4, 2017

(65) Prior Publication Data
US 2019/0104186 A1 Apr. 4, 2019

(51) Int. Cl.
*H04L 29/08* (2006.01)
*H04L 29/12* (2006.01)
*H04L 29/06* (2006.01)
*G06Q 30/02* (2012.01)

(52) U.S. Cl.
CPC ............ *H04L 67/22* (2013.01); *G06Q 30/02* (2013.01); *H04L 61/1511* (2013.01); *H04L 61/35* (2013.01); *H04L 63/00* (2013.01); *H04L 63/0227* (2013.01); *H04L 63/164* (2013.01); *H04L 67/025* (2013.01); *H04L 67/303* (2013.01)

(58) Field of Classification Search
CPC ..... H04L 67/22; H04L 61/35; H04L 63/0227; H04L 63/164; H04L 63/00; H04L 61/1511; H04L 67/303; H04L 67/025; G06Q 30/02
See application file for complete search history.

(56) References Cited

U.S. PATENT DOCUMENTS

| 10,218,597 | B1 * | 2/2019 | Miller | H04L 43/0876 |
| 2005/0185579 | A1 * | 8/2005 | Jung | H04L 1/1832 370/229 |
| 2008/0034077 | A1 * | 2/2008 | Takashige | G06Q 10/06 709/223 |
| 2010/0023611 | A1 * | 1/2010 | Yang | H04L 29/12066 709/223 |
| 2011/0082931 | A1 * | 4/2011 | Wang | H04L 29/12066 709/224 |
| 2011/0295998 | A1 * | 12/2011 | Ferris | G06F 9/5072 709/224 |
| 2013/0262681 | A1 * | 10/2013 | Guo | G06F 9/5027 709/226 |
| 2015/0288581 | A1 * | 10/2015 | Yang | H04L 12/14 709/224 |

(Continued)

*Primary Examiner* — Oanh Duong
(74) *Attorney, Agent, or Firm* — McCarter & English, LLP

(57) ABSTRACT

Described in detail herein is a usage tracking system. In exemplary embodiments, an usage application executed on a device can transmit a request to a computing system for connecting the device to the Internet. The computing system can include a first server and a second server. The computing system can receive the request for connecting the device to the Internet from the application. The first server can initiate a connection of the device with the Internet. The first server can allocate a range of Internet Protocol (IP) addresses to the at least one device based on a set of selected digital services being executed on the at least one device. Each IP address of the range of IP addresses corresponds to a digital service of selected set of digital services executed on the at least one device.

21 Claims, 7 Drawing Sheets

(56) References Cited

U.S. PATENT DOCUMENTS

| | | | |
|---|---|---|---|
| 2015/0350044 A1* | 12/2015 | Thomassian | H04L 61/1511 370/252 |
| 2015/0350256 A1* | 12/2015 | Pauly | H04L 65/1069 709/227 |
| 2016/0323239 A1* | 11/2016 | Cheng | G06Q 30/02 |
| 2017/0163666 A1* | 6/2017 | Venkatramani | H04L 63/0272 |
| 2017/0171221 A1* | 6/2017 | Ho | H04L 61/2503 |

* cited by examiner

SYSTEM AND METHODS FOR TRACKING THE USAGE OF DIGITAL SERVICES

BACKGROUND

Tracking usage of digital services on devices can introduce user experience issues such as privacy concerns, slow web browsing, and internet disruption. Furthermore, it requires costly infrastructure to handle massive amounts of data from users and special custom software to extract insights from collected data.

SUMMARY

While tracking internet traffic, large amounts of data can be captured including sensitive and/or private information. Users can be hesitant to install usage tracking applications on their devices as sensitive information can be transmitted while the usage is being tracked. Furthermore, conventionally tracking usage data may be limited to internet traffic captured from devices. However, it may be important to track the usage applications installed on devices as well as the internet traffic generated by the applications. Lastly, processing and/or querying metadata collected from different internet services and/or applications executed on a device can be a difficult and error prone process. Each internet service and/or application executed on the device can implement a different communications protocol. Accordingly, a custom parser would need to be developed for each internet service and/or application executed on the device to execute queries of specific parameters. The process of writing customer parsers is time consuming and can be error prone.

Embodiments of the system for usage tracking provides for securely routing selected traffic based on specific internet services which are to be monitored. The system provides for a "whitelist mechanism" in which, select internet traffic, including metadata, is transmitted to the servers. In this regard, the sensitive and/or private data on a device can remain unmonitored and untouched and by using the "whitelist mechanism" the system provides for a technical solution of limiting the monitored usage to selected internet services and/or applications executed on a device. The system can execute queries using specified parameters on the metadata to generate automatic parsers for the various internet services and/or applications executed on the device. By generating automatic parsers the system can prevent the complicated and time consuming task of generating custom parsers for each internet service and/or application executed on the device. The system further provides for a supervised learning system that can capture Domain Name Service (DNS) traffic and identify usage information associated with the internet services and/or applications. The system provides for capturing usage information which is not just limited to the captured traffic but can also include frequency, date and time information of the usage of each internet service and/or application executed on the device.

Exemplary embodiments of the present disclosure include a system, method and non-transitory computer readable medium for tracking usage of digital services being executed on devices. An instance of an application can be executed on multiple devices. The instance of the application can transmit a request to a computing system for connecting the device, on which the instance of the application is being executed, to the Internet. The computing system can include a first server, a second server and can be operatively coupled to a database and to each instance of the application being executed on the devices. The computing system is generally configured to receive the request for connecting the device to the Internet from the instance of the application, initiate, via the first server, a connection of the device and the Internet based on the request, and allocate, via the first server, a range of Internet Protocol (IP) addresses to the device based on a set of selected digital services being executed on the device. Each IP address of the range of IP addresses corresponds to a digital service of a selected set of digital services executed on the at least one device. The digital services can be web-applications.

The exemplary instance of the application is generally configured to transmit a subsequent request to the computing system. The subsequent request includes a DNS query request of a data storage facility associated with a digital service. The computing system is further configured to receive, via the second server, the request from the instance of the application, and assign, via the second server, an IP address from the range of IP addresses corresponding to the data storage facility associated with the digital service. The device is generally configured to attempt access the data storage facility associated with the at least one digital service via the assigned IP address. The attempt is routed to the first server of the computing system based on the IP address. The computing system is further configured to receive, via the first server, the routed attempt to access the data storage facility associated with the digital service, route, via the first server, the device to the data storage facility associated with the digital service, and capture sets of data included in the data storage facility, in response to routing the device to the data storage facility associated with the digital service. The computing system is configured to track the usage of at least one digital service based on the captured sets of data from the data storage facility associated with the digital service.

The data storage facility includes a first sub-domain and a second sub-domain. The first sub-domain includes a first set of data from the sets of data and the second sub-domain includes a second set of data from the sets of data. The computing system is configured to distinguish the first sub-domain from the second sub-domain. The computing system is configured to determine a type of the at least one digital service, retrieve a set of parameters from the database and search for instances of the set of parameters in the captured sets of data.

Additional features, functions and benefits associated with the present disclosure will become apparent from the description which follows, particularly when read in conjunction with the accompanying figures.

BRIEF DESCRIPTION OF DRAWINGS

The accompanying figures, which are incorporated in and constitute a part of this specification, illustrate one or more embodiments of the present invention and, together with the description, help to explain the present invention. The embodiments are illustrated by way of example and should not be construed to limit the present invention. In the figures.

DETAILED DESCRIPTION

Described in detail herein is a system for usage tracking. While tracking internet traffic, large amounts of data can be captured including sensitive private information. Embodiments of the system for usage tracking provides for securely routing selected traffic based on specific internet services which are to be monitored. The system provides for a "whitelist mechanism" in which, select internet traffic, including metadata, is transmitted to the servers. The system can execute queries using specified parameters on the metadata to generate automatic parsers. The system further provides for a supervised learning system that can capture Domain Name Service (DNS) traffic and identify usage information associated with web applications.

In exemplary embodiments, an usage application executed on a device is adapted to transmit a request to a computing system for connecting the device to the Internet. The computing system can include a first server and a second server. The computing system can receive the request for connecting the device to the Internet from the application. The first server can initiate a connection of the device with the Internet. The first server can allocate a range of Internet Protocol (IP) addresses to the at least one device based on a set of selected digital services being executed on the at least one device. Each IP address of the range of IP addresses corresponds to a digital service of selected set of digital services executed on the at least one device.

The usage application can transmit a subsequent request to the computing system. The subsequent request generally includes a DNS query request of a data storage facility associated with a digital service being executed on the device. The second server can receive the supplemental request including the DNS query request, from the usage application 442 (see FIG. 4). The second server can assign an IP address from a range of IP addresses corresponding to the data storage facility associated with the digital service. The device can attempt to access the data storage facility associated with the digital service via the assigned IP address. The attempt is routed to a first server based on the assigned IP address. The first server can receive the routed attempt to access the data storage facility associated with the at least one digital service. The first server can route the device to the data storage facility associated with the at least one digital service. The computing system can capture sets of data included in the data storage facility, in response to routing the device to the data storage facility associated with the digital service.

Figure 1:
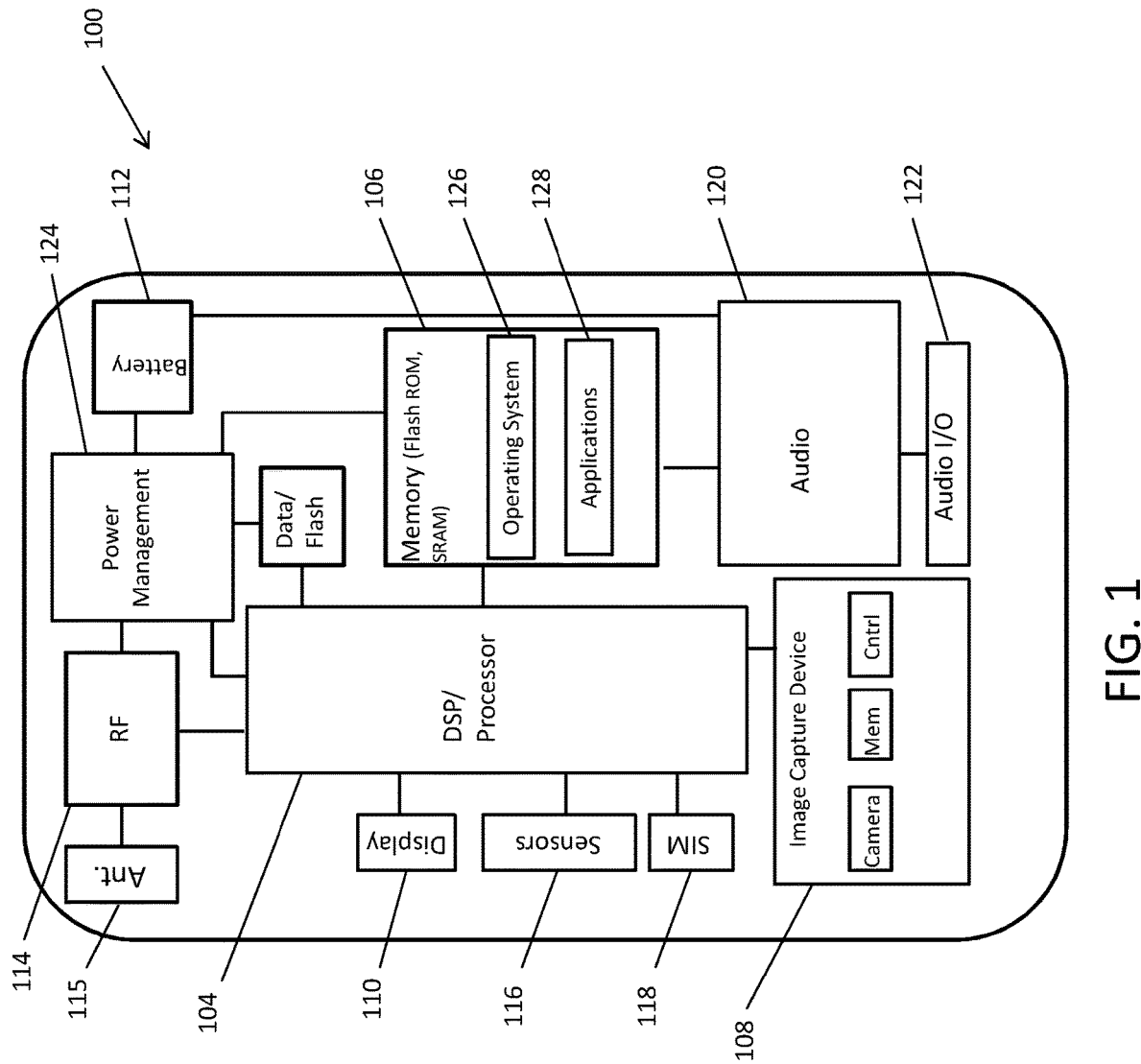
FIG. 1 is a block diagram of a device that can be utilized to implement and/or interact with embodiments of a usage tracking system

FIG. 1 is a block diagram of a device 100 that can be utilized to implement and/or interact with embodiments of a usage tracking system according to the present disclosure. The device 100 can be a smartphone, tablet, subnotebook, laptop, personal digital assistant (PDA), and/or any other suitable device that can be programmed and/or configured to implement and/or interact with embodiments of a usage tracking system. The device 100 can include a processing device 104, such as a digital signal processor (DSP) or microprocessor, memory/storage 106 in the form a non-transitory computer-readable medium, an image capture device 208, a display 110, a battery 112, and a radio frequency transceiver 114. Some embodiments of the device 100 can also include other common components, such as sensors 116, subscriber identity module (SIM) card 118, audio input/output components 220 and 222 (including, e.g., one or more microphones and one or more speakers), and power management circuitry 124.

The memory 106 can include any suitable, non-transitory computer-readable storage medium, e.g., read-only memory (ROM), erasable programmable ROM (EPROM), electrically-erasable programmable ROM (EEPROM), flash memory, and the like. In exemplary embodiments, an operating system 126 and applications 128 can be embodied as computer-readable/executable program code stored on the non-transitory computer-readable memory 106 and implemented using any suitable, high or low level computing language and/or platform, such as, e.g., Java, C, C++, C#, assembly code, machine readable language, and the like. In some embodiments, the applications 128 can include an assistance application configured to interact with the microphone, a web browser application, a mobile application specifically coded to interface the usage tracking system. While memory is depicted as a single component those skilled in the art will recognize that the memory can be formed from multiple components and that separate non-volatile and volatile memory device can be used.

The processing device 104 can include any suitable single- or multiple-core microprocessor of any suitable architecture that is capable of implementing and/or facilitating an operation of the device 100. For example, to execute various digital services, access the Internet, display image and video files, perform an image capture operation, capture a voice input of the user (e.g., via the microphone), display data/information including GUIs of the user interface 110, captured images, voice input transcribed as text, and the like. The processing device 104 can be programmed and/or configured to execute the operating system 126 and applications 128 to implement one or more processes to perform an operation. The applications 128 can be digital services. The processing device 104 can retrieve information/data from and store information/data to the storage device 106. For example, the processing device can retrieve and/or store captured images, recorded voice input, voice input transcribed to text, and/or any other suitable information/data that can be utilized by the device and/or the user.

The RF transceiver 114 can be configured to transmit and/or receive wireless transmissions via an antenna 115. For example, the RF transceiver 114 can be configured to transmit data/information, such as one or more images captured by the image capture device and/or transcribed voice input, and/or other messages, directly or indirectly, to one or more remote computing systems. The RF transceiver 114 can be configured to transmit and/or receive information having at a specified frequency and/or according to a specified sequence and/or packet arrangement.

The display 110 can render user interfaces, such as graphical user interfaces to a user and in some embodiments can provide a mechanism that allows the user to interact with the GUIs. For example, a user may interact with the device 100 through display 110, which may be implemented as a liquid crystal touch-screen (or haptic) display, a light emitting diode touch-screen display, and/or any other suitable display device, which may display one or more user interfaces (e.g., GUIs) that may be provided in accordance with exemplary embodiments.

The power source 112 can be implemented as a battery or capacitive elements configured to store an electric charge and power the device 100. In exemplary embodiments, the power source 112 can be a rechargeable power source, such as a battery or one or more capacitive elements configured to be recharged via a connection to an external power supply.

Figure 2:
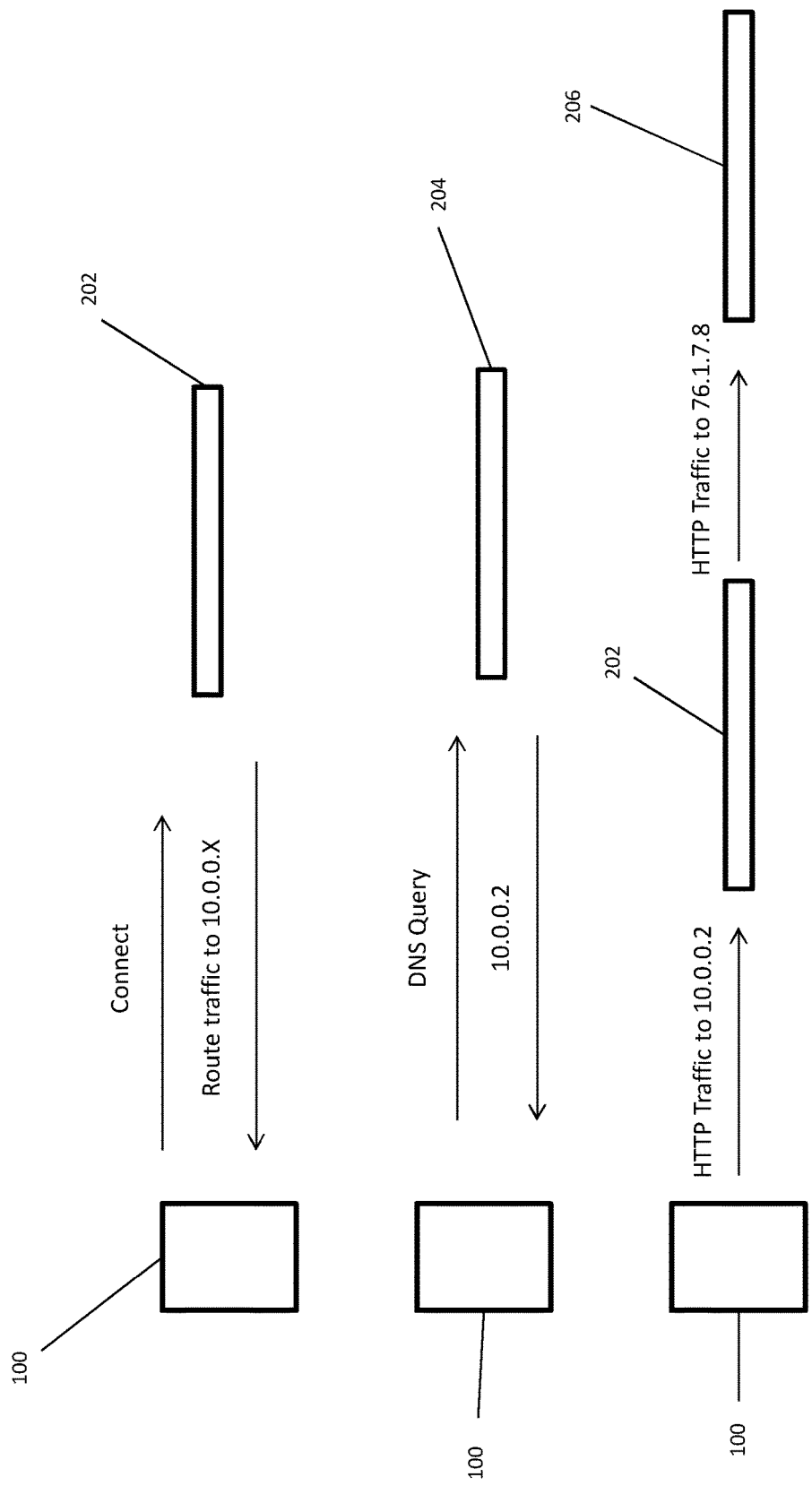
FIG. 2 is a block diagram illustrating the routing of data services in accordance with an exemplary embodiment.

FIG. 2 is a block diagram illustrating the routing of data in accordance with an exemplary embodiment. In exemplary embodiments, a usage application can be executed on a device 100. The device 100 can attempt to connect to the Internet, via the usage application. The usage application can direct the device 100 to a first server 202 of a computing system. The first server 202 can be a Virtual Private Network (VPN) server. The first server 202 can connect the device to the Internet using a VPN. A first server 202 can establish a virtual point-to-point connection through the use of dedicated connections, virtual tunneling protocols, or traffic encryption. The computing system and usage application will be discussed further in detail with respect to FIG. 4.

The first server 202 can identify the multiple digital services executed and/or residing on the device 100. The digital services can be web applications. The first server 202 can identify a set of digital services for which the usage is to be tracked. The first server 202 allocate a range of IP addresses based on the set of digital services for which usage is to be tracked. The range of IP addresses can be allocated to the specific device 100. For example, the first server 202 can instruct the usage application to route all HTTP traffic for the identified set of digital services to a range of IP addresses. As a non-limiting example, the range can be 10.0.0.X. The 'X' can denote any numerical value.

The device 100 can attempt connect to a digital service from the set of digital services for which the usage is to be tracked. The device 100 can transmit a Domain Name System (DNS) query request. The usage application can direct the DNS query request to a second server 204. The second server can be a DNS server. The second server 204 can be configured to resolve DNS query requests by issuing IP addresses to the corresponding domain names. The second server 204 can resolve the DNS query request by assigning the digital service an IP address from the range of IP addresses allocated to the device 100. The second server 204 can issue the assigned IP address to the device 100. Continuing with the non-limiting example discussed above, the device 100 can attempt to execute a YouTube® application. The YouTube® application can attempt to connect to s.youtube.com. The device 100 can transmit a DNS query request of s.youtube.com to the second server 204. The second server 204 can determine that YouTube is a digital service to be tracked and the range of IP addresses allocated for the device 100 is 10.0.0.X. The second server 204 can issue 10.0.0.2 to the device 100, for the device to connect to the s.youtube.com.

The device 100 can transmit HTTP traffic to the issued IP address. The IP address can route HTTP traffic from the device 100 the first server 202. The first server 202 can determine the digital service corresponding to the issued IP address. The first server 202 can route device 100 to the data storage facility 206 of the digital service. The data storage facility can be a web domain, a URL, URI and/or database. Continuing with the non-limiting example discussed above, the device 100 can transmit HTTP traffic to 10.0.0.2. The HTTP traffic from the device 100 can be routed to the first server 202. The first server 202 can identify 10.0.0.2 corresponds with s.youtube.com and that the IP address for s.youtube.com, is 76.1.7.8. The first server 202 can route the HTTP traffic from the device 100 to 76.1.7.8. The first server 202 can capture all the data transmitted from the device 100, to s.youtube.com and all of the data presented on s.youtube.com, transmitted to the device 100.

Figure 3:
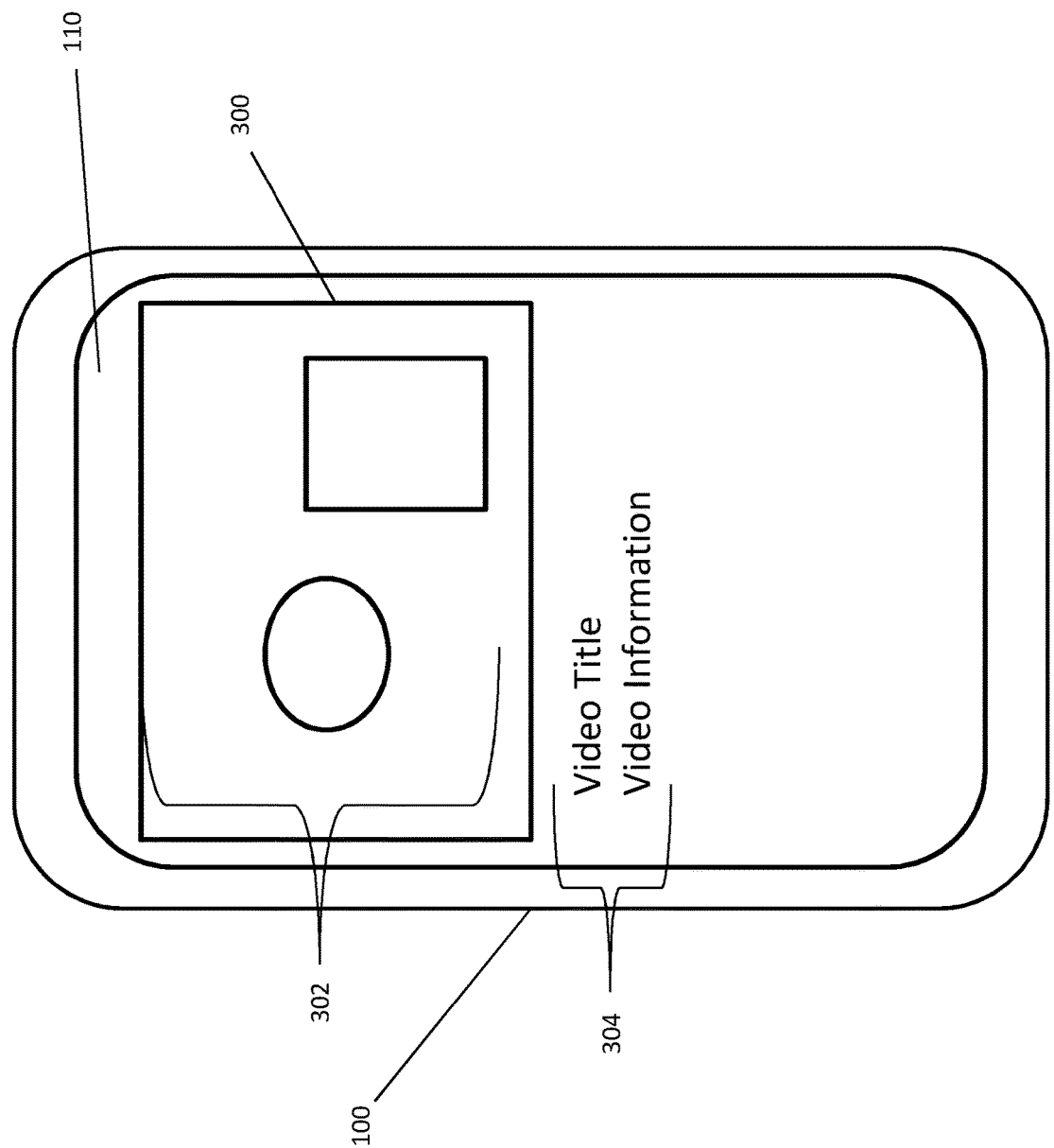
FIG. 3 is an exemplary device executing a digital service in accordance with an exemplary embodiment.

FIG. 3 is an exemplary device executing a digital service in accordance with an exemplary embodiment. As discussed above, the device 100 can execute digital services. The digital service can be displayed on the display 110. For example, the digital service can be a YouTube® application. The YouTube® application can display a video 300 on the display 110. The YouTube® application can include data including video content 302 and metadata 304 associated with the video 300. The metadata 304 can include the name of the video, description of the video, date created and other information associated with the video. The video content 302 can be stored in a separate sub-domain from the metadata 304. A computing system can capture the video content 302 and the metadata 304. The details of the computing system will be described in further detail with reference to FIG. 4.

Figure 4:
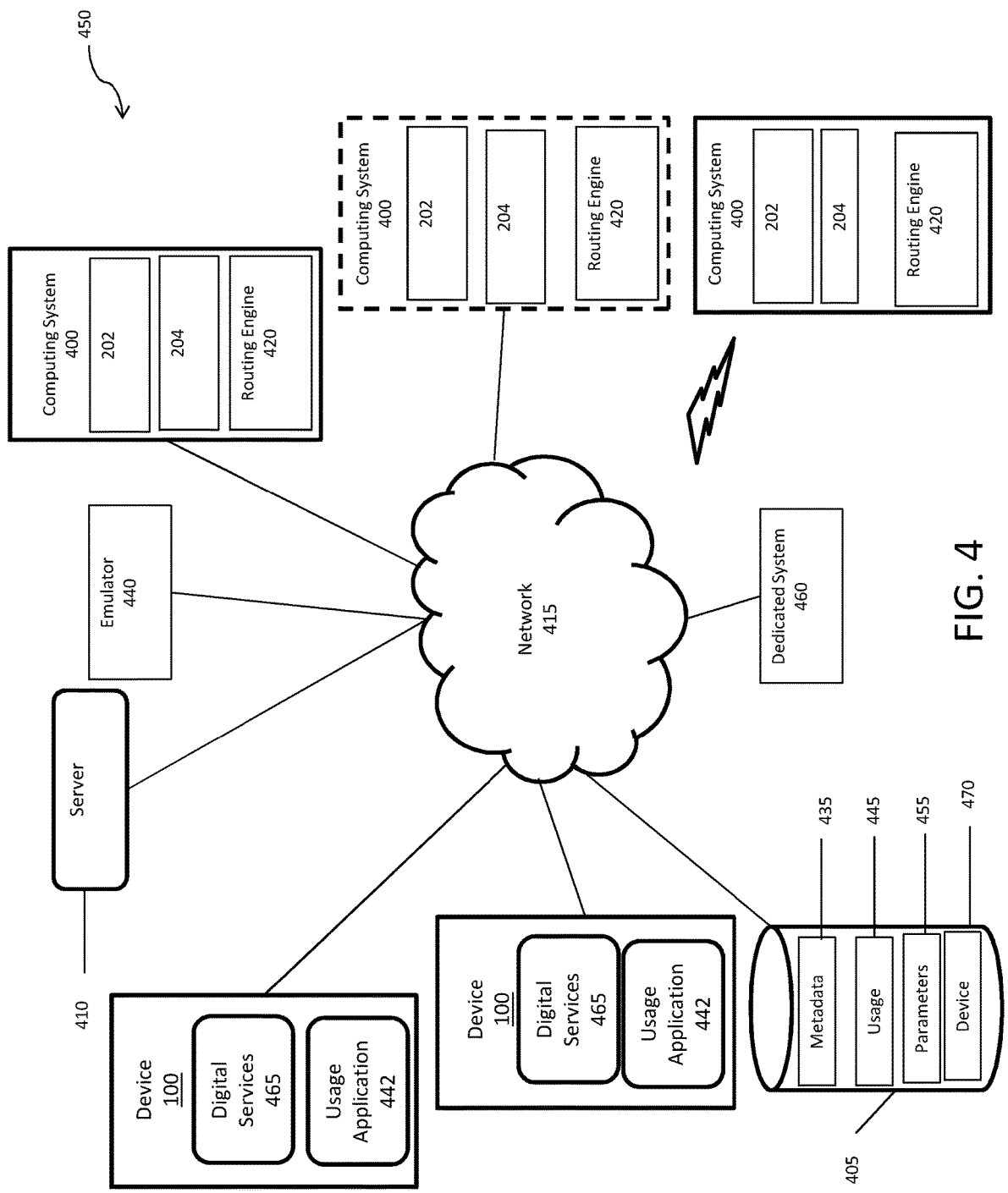
FIG. 4 is a network diagram of a usage tracking system in accordance with an exemplary embodiment.

FIG. 4 is a network diagram of a usage tracking system in accordance with an exemplary embodiment. The usage tracking system 450 can include a database 405, one or more of computing systems 400, one or more devices 100, one or more emulators 440 and one more parsing engines 460. In some embodiments the one or more emulators 440 and/or the one or more dedicated systems 460 can reside within the computing system 400. Alternatively, the emulators 440 and dedicated system 460 can reside as standalone systems. In one exemplary embodiment, the computing system 400 can be in communication with the database(s) 405, and one or more devices 100, via a communications network 415. The device 100 can execute an instance of a usage application 442. The usage application 442 can communicate with the computing system 400 as will be described herein. The device 100 can execute multiple digital services 465. The digital services 465 can be web applications. Web applications are client-server software applications which include a user interface running on a web browser of the device 100. The web applications can run on the web browser using an application programming interface (API). The digital services 265 can include a Gmail application, YouTube® application, Netflix® application, ESPN® application and/or other web applications executed on the device 100. The computing system 400 can implement an instance of the routing engine 420. The routing engine 420 can be an executable residing on the computing system 200. The routing engine 420 can implement the process of the usage tracking system 450 as described herein. The computing system 400 can include a first server 202 and a second server 204.

In an example embodiment, one or more portions of the communications network 415, can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The computing system 400 includes one or more computers or processors configured to communicate with the databases 405, servers 410, devices 100, emulators 440, and dedicated systems 460. via the network 415. The computing system 400 hosts one or more applications configured to interact with one or more components of the usage tracking system 450. The databases 405 may store information/data, as described herein. For example, the databases 405 can include a metadata database 435, a usage database 445, a parameters database 455 and a device database 470. The metadata database 435 can store metadata extracted from digital services executed on devices 100. The usage database 445 can store the usage data associated with the digital services executed on the devices. The parameters database 435 can store parameters to be searched for in metadata. The device database 470 can store device identifiers. The databases 405 and server 410 can be located at one or more geographically distributed locations from each other or from the computing system 400. Alternatively, the databases 405 can be included within server 410 or computing system 404.

In exemplary embodiments, the usage application 442 can transmit a request to the computing system 400 to connect the device to the Internet. The computing system 400 can execute the routing engine 420 in response to receiving the request. The routing engine 420 can direct the usage application 442 the first server 202 of the computing system 400. The first server 202 can be a VPN server. The first server 202 can connect the device to the Internet using a VPN. The first server 202 can identify the multiple digital services 465 executed and/or residing on the device 100. The routing engine 420 can select a set of digital services for which the usage is to be tracked. For example, the device can execute the following digital services: YouTube®, ESPN®, and Gmail®. The routing engine 420 can select to track the usage of YouTube® and ESPN®. The unselected digital services on the device 100 will remain untouched and will not be tracked. The routing engine 420 can also capture a device identifier of the device. The identifier can be identifier can be one or more of Unique Device ID (UDID), the International Mobile Equipment Identity (IMEI), Integrated Circuit Card Identifier (ICCID) and/or the Mobile Equipment Identifier (MEID). The routing engine 420 can store the device identifier in the device database 470. The first server 202 can identify the set of digital services 465 for which the usage is to be tracked, selected by the routing engine 420. The first server 202 allocate a range of IP addresses based on the set of digital services for which usage is to be tracked. By selecting the set of digital services, the routing engine 420 can capture data from only associated to the selected set of digital services. Any HTTP traffic and/or other data associated with unselected digital services will remain unmonitored and untouched. In this regard, the routing engine 420 provides for a secure manner for capturing the data associated with the selected digital services and maintaining the privacy and integrity of the data associated with the unselected digital services.

The device 100 can attempt connect to a digital service from the set of digital services for which the usage is to be tracked. The usage application 442 can recognize the usage of the selected digital service is being tracked. The usage application 442 can transmit a Domain Name System (DNS) query request. The routing engine 420 can instruct the usage application 442 to direct the DNS query request to a second server 204. The second server 204 can resolve the DNS query request by assigning the digital service an IP address from the range of IP addresses allocated to the device 100. The second server 204 can issue the assigned IP address to the device 100.

The device 100 can transmit HTTP traffic to the issued IP address. The IP address can route HTTP traffic from the device 100 the first server 202. The first server 202 can determine the digital service corresponding to the issued IP address. The first server 202 can route device 100 to the data storage facility of the digital service. The data storage facility can be a web domain, a URL, URI and/or a database.

The routing engine 420 can capture the HTTP traffic and store the HTTP traffic in the usage database 445. The HTTP traffic can include the data transmitted to and from the device and the selected digital services 465. Furthermore, the routing engine 420 can capture the metadata associated with the data storage facility. For example, in the event the device is executing a video streaming application, the device can capture the video data and the metadata associated with the video. The routing engine 420 can store the video data in the usage database 445 and can store the metadata associated with the video in the metadata database 445. The metadata database 435 and usage database 445 can correlate the stored data based on device identifiers and type of digital service.

In some embodiments, a digital service 465 can store the data in multiple different domains. For example, metadata data can be stored in one sub-domain, while the remaining data can be stored in a separated sub-domain. The routing engine 420 can capture the data from both sub-domains and distinguish between the metadata and the remaining data. The computing system 400 can store the metadata in the metadata database 435 and the remaining data in the usage database 445.

In some embodiments, the routing engine 420 can instruct the emulator 440 to determine information associated with the usage of the digital services 265. The information can include which digital services are being used, the lengths of time the digital services are being used and the frequency of use of the digital service. The emulator 440 can retrieve all of the traffic captured from the device 100 to and from the selected digital services which have been tracked, from the usage database 445. The emulator can generate a training set based on the retrieved traffic. The emulator can use the training set in a supervised learning system to determine the information associated with the digital services.

In some embodiments, the routing engine 420 can retrieve specified device identifiers, from the device database 470 based on specified search constraints. As a non-limiting example, the routing engine 420 search for specific device identifiers in a specified geographic region and/or for a specific demographic of users of the device. It can be appreciated, the search of specified device identifiers can be limited by multiple different constraints. The routing engine 420 can instruct the emulator to determine information associated with one or more digital services for specified devices identifiers.

In some embodiments, the routing engine 440 can search for specific parameters in the metadata captured from multiple different digital services. Each digital service can implement a different communication protocol. As mentioned above, the routing engine 440 can distinguish between the metadata and the remaining data from the captured traffic. The routing engine can instruct the dedicated system 460 to execute automatic searches of parameters from the metadata. The instructions can include searching for parameters in metadata collected from multiple devices for a specific digital service. In some embodiments, the instructions can include limiting the search to devices 100 specific geographic regions and/or devices 100 belonging to specific demographic of users. The dedicated system 460 can query the parameters database 455 to retrieve search parameters based on the instructions. The search parameters can be one or more search strings. The dedicated system 460 can retrieve the one more search strings using a specific key associated with the devices 100 and/or digital services 465 which were included in the instructions from the routing engine 420. The search strings can be alphanumeric text, images and/or videos. The dedicated system 460 can query the metadata database 435 to retrieve metadata based on the instructions. The dedicated system 460 can search for instances in the one or more search strings in the retrieved metadata. The dedicated system 460 can generate an automatic parser based on the search results for each of the digital services. For example, the dedicated system 460 can automatically search for the specified search strings based on instructions from the routing engine 420. In a non-limiting example, the dedicated system 460 can search for the specified search strings after a specified period of time. Alternatively, the dedicated system 460 can search for the specified search strings after a specified event. In some embodiments, the routing engine 420 can instruct the dedicated system to search for instances of specified parameters in the metadata of specified digital services executed on specified device identifiers.

Figure 5:
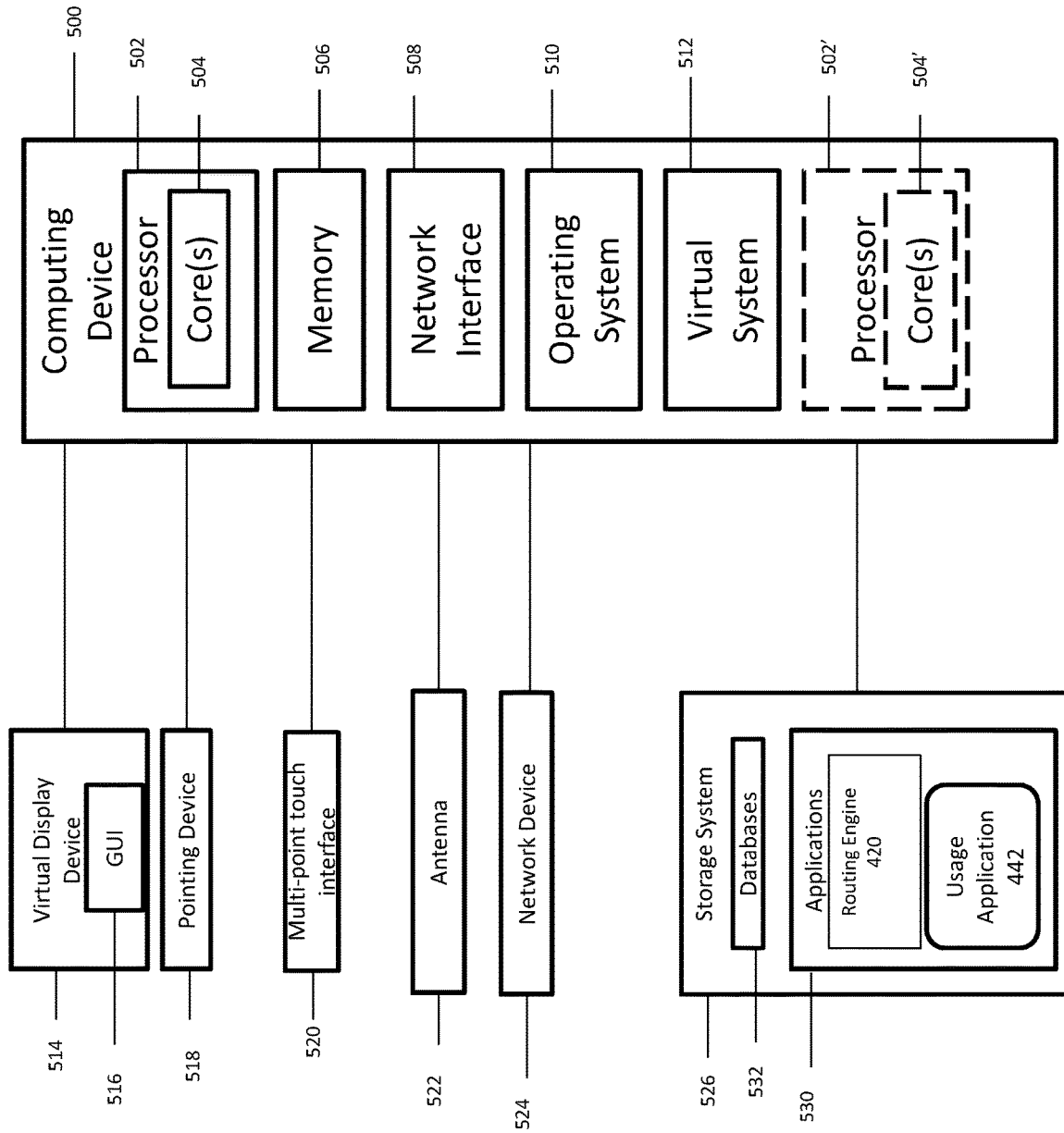
FIG. 5 is a block diagram illustrating an exemplary computing device in accordance with an exemplary embodiment.

FIG. 5 is a block diagram of an example computing device for implementing exemplary embodiments. The computing device 500 can implement embodiments of the usage tracking system. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 506 included in the computing device 500 may store computer-readable and computer-executable instructions or software (e.g., applications 530 such as the routing engine 420 or the usage application 442) for implementing exemplary operations of the computing device 500. The computing device 500 also includes configurable and/or programmable processor 502 and associated core(s) 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for implementing exemplary embodiments. Processor 502 and processor(s) 502' may each be a single core processor or multiple core (504 and 504') processor. Either or both of processor 502 and processor(s) 502' may be configured to execute one or more of the instructions described in connection with computing device 500.

Virtualization may be employed in the computing device 500 so that infrastructure and resources in the computing device 500 may be shared dynamically. A virtual machine 512 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 506 may include other types of memory as well, or combinations thereof.

A user may interact with the computing device 500 through a visual display device 514, such as a computer monitor, which may display the graphical user interfaces 516. The graphical user interface 516 can be generated by the deployment web-service as discussed above. The computing device can include input/output devices such as multi touch interface 520, a keyboard and a pointing device 518.

The computing device 504 may also include one or more storage devices 526, such as a hard-drive, CD-ROM, or other computer readable media, for storing data and computer-readable instructions and/or software that implement exemplary embodiments (e.g., applications such as the routing engine 420 and the usage application 442). For example, exemplary storage device 326 can include one or more databases 505 for storing information regarding metadata, parameters, usage of a digital service, and device identifiers. The databases 505 may be updated manually or automatically at any suitable time to add, delete, and/or update one or more data items in the databases.

The computing device 500 can include a network interface 508 configured to interface via one or more network devices 524 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 522 to facilitate wireless communication (e.g., via the network interface) between the computing device 500 and a network and/or between the computing device 500 and other computing devices. The network interface 508 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

The computing device 500 may run operating system 510, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 500 and performing the operations described herein. In exemplary embodiments, the operating system 510 may be run in native mode or emulated mode. In an exemplary embodiment, the operating system 510 may be run on one or more cloud machine instances.

Figure 6:
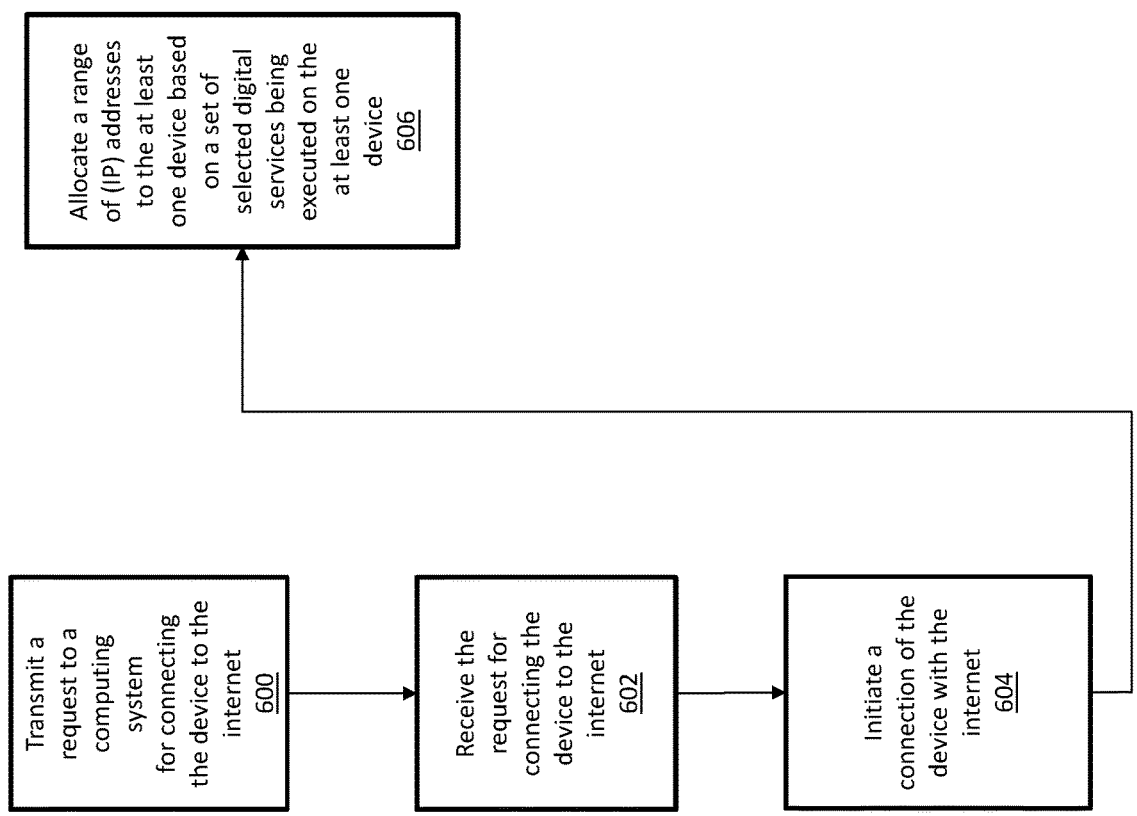
FIG. 6 is a flowchart illustrating an exemplary process performed by a usage tracking system deployment system according to an exemplary embodiment.

FIG. 6 is a flowchart illustrating an exemplary process performed by a usage tracking system deployment system according to an exemplary embodiment. In operation 600, an instance of an usage application (e.g., usage application 442 as shown in FIG. 4) executed on a device (e.g., device 100 as shown in FIGS. 1-4) can transmit a request to a computing system (e.g., computing system 400 as shown in FIG. 4) for connecting the device to the Internet. The computing system can include a first server (e.g., first server 202 as shown in FIGS. 2 and 4) and a second server (e.g., second server 204 as shown in FIGS. 2 and 4). The first server can be a VPN server and the second server can be a DNS server.

In operation 602, the computing system can receive the request for connecting the device to the Internet from the application. In operation 604, the first server can initiate a connection of the device with the Internet. In operation 606, the first server can allocate a range of Internet Protocol (IP) addresses to the at least one device based on a set of selected digital services being executed on the at least one device.

Each IP address of the range of IP addresses corresponds to a digital service of selected set of digital services executed on the at least one device.

Figure 7:
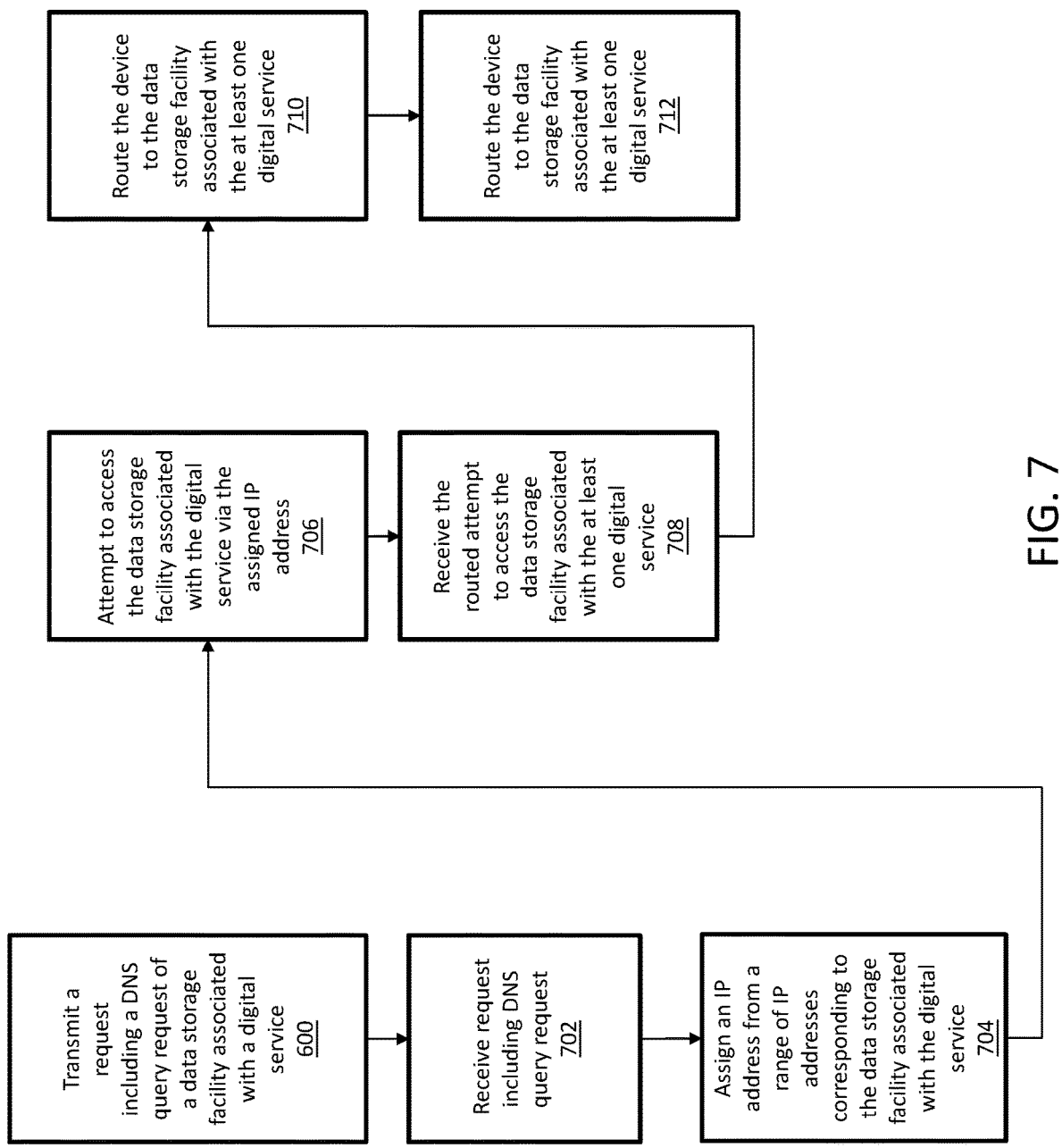
FIG. 7 is a flowchart illustrating an exemplary process performed by a usage tracking system deployment system according to an exemplary embodiment.

FIG. 7 is a flowchart illustrating an exemplary process performed by an usage tracking system deployment system according to an exemplary embodiment. In operation 700, an instance of an usage application (e.g., usage application 442 as shown in FIG. 4) being executed on a device (e.g., device 100 as shown in FIGS. 1-4) can transmit a request to a computing system (e.g., computing system 400 as shown in FIG. 4). The computing system can include a first server (e.g. first server 202 as shown in FIGS. 2 and 4) and a second server (e.g., second server 204 as shown in FIGS. 2 and 4). The first server can be a VPN server and the second server can be a DNS server. The request includes a DNS query request of a data storage facility associated with a digital service (e.g., digital service 465 as shown in FIG. 4) being executed on the device.

In operation 702, a second server can receive request including DNS query request, from the usage application 442. In operation 704, the second server can assign an IP address from a range of IP addresses corresponding to the data storage facility associated with the digital service. In operation 706, the device can attempt to access the data storage facility associated with the digital service via the assigned IP address. The attempt is routed to a first server based on the assigned IP address. In operation 708, the first server can receive the routed attempt to access the data storage facility associated with the at least one digital service. In operation 710, the first server can route the device to the data storage facility associated with the at least one digital service. In operation 712, the computing system can capture sets of data included in the data storage facility, in response to routing the device to the data storage facility associated with the digital service.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present invention. Further still, other aspects, functions and advantages such as different combinations of the described embodiments are also within the scope of the present invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A system for tracking usage of digital services, the system comprising:
    an instance of an application executed on each of a plurality of devices, at least one instance of the application executed on at least one device configured to:
        transmit a first request for connecting the at least one device to the Internet, and
        transmit a second request that includes a DNS query request of a data storage facility associated with at least one digital service;
    at least one computing device including a first server, a second server and operatively coupled to a database and each instance of the application, the at least one computing device configured to:
        receive the first request for connecting the at least one device to the Internet from the at least one instance of the application;
        initiate, via the first server, a connection of the at least one device and the Internet via a virtual private network (VPN) based on the first request;
        allocate, via the first server, a range of Internet Protocol (IP) addresses to the at least one device based on a set of selected digital services being executed on the at least one device, wherein each IP address of the range of IP addresses corresponds to at least one digital service of selected set of digital services executed on the at least one device;
        receive, via the second server, the second request from the application; and
        assign, via the second server, at least one IP address from the range of addresses corresponding to the data storage facility associated with the at least one digital service,
        wherein upon an attempt of the at least one device to access the data storage facility associated with the at least one digital service via the at least one IP address, the at least one computing device routes the attempt to the first server of the at least one computing device based on the at least one IP address.

2. The system of claim 1, wherein the at least one computing device is further configured to:
    receive, via the first server, the routed attempt to access the data storage facility associated with the at least one digital service;
    route, via the first server, the at least one device to the data storage facility associated with the at least one digital service;
    capture sets of data included in the data storage facility, in response to routing the at least one device to the data storage facility associated with the at least one digital service.

3. The system of claim 2, wherein the at least one computing device is configured to track the usage of at least one digital service based on the captured sets data from data storage facility associated with the at least one digital service.

4. The system of claim 1, wherein the data storage facility includes a first sub-domain and a second sub-domain, wherein the first sub-domain includes a first set of data from the sets of data and the second sub-domain includes a second set of data from the sets of data.

5. The system of claim 4, wherein the at least one computing device is configured to distinguish the first sub-domain from the second sub-domain.

6. The system of claim 5, wherein the at least one computing device is configured to: determine a type of the at least one digital service;
    retrieve a set of parameters from the database; and search for instances of the set of parameters in the captured sets of data.

7. The system of claim 1, wherein the digital services are web-applications.

8. A method for tracking usage of digital services, the system comprising:
   transmitting, via at least one instance of an application executed on at least one device of a plurality of devices, a first request for connecting the at least one device to the Internet;
   transmitting, via the at least one instance of an application, a second request that includes a DNS query request of a data storage facility associated with at least one digital service;
   receiving, via a computing system including a first server, a second server and operatively coupled to a database and each instance of the application, the first request for connecting the at least one device to the Internet from the at least one instance of the application;
   initiating, via the first server of the computing system, a connection of the at least one device and the Internet via a virtual private network (VPN) based on the first request;
   allocating, via the first server of the computing system, a range of Internet Protocol (IP) addresses to the at least one device based on a set of selected digital services being executed on the at least one device, wherein each IP address of the range of IP addresses corresponds to at least one digital service of selected set of digital services executed on the at least one device;
   receiving, via the second server, the second request from the application;
   assigning, via the second server, at least one IP address from the range of addresses corresponding to the data storage facility associated with the at least one digital service; and
   attempting, via the at least one device, to access the data storage facility associated with the at least one digital service via the at least one IP address, wherein the attempt is routed to the first server of the computing system based on the at least one IP address.

9. The method of claim 8, further comprising:
   receiving, via the first server of the computing system, the routed attempt to access the data storage facility associated with the at least one digital service;
   routing, via the first server of the computing system, the at least one device to the data storage facility associated with the at least one digital service;
   capturing, via the computing system, sets of data included in the data storage facility, in response to routing the at least one device to the data storage facility associated with the at least one digital service.

10. The method of claim 9, further comprising tracking, via the computing system, usage of at least one digital service based on the captured sets data from data storage facility associated with the at least one digital service.

11. The method of claim 8, wherein the data storage facility includes a first sub-domain and a second sub-domain, wherein the first sub-domain includes a first set of data from the sets of data and the second sub-domain includes a second set of data from the sets of data.

12. The method of claim 11, further comprising distinguishing, via the computing system, the first sub-domain from the second sub-domain.

13. The method of claim 12, further comprising:
   determining, via the computing system, a type of the at least one digital service;
   retrieving, via the computing system, a set of parameters from the database; and
   searching, via the computing system, for instances of the set of parameters in the captured sets of data.

14. The method of claim 8, wherein the digital services are web-applications.

15. One or more non-transitory computer readable memory media storing instructions, wherein the instructions are executable by one or more processors to:
   transmit, via at least one instance of an application executed on at least one device of a plurality of devices, a first request for connecting the at least one device to the Internet;
   transmit, via at least one instance of an application, a second request that includes a DNS query request of a data storage facility associated with at least one digital service;
   receive, via a computing system including a first server, a second server and operatively coupled to a database and each instance of the application, the first request for connecting the at least one device to the Internet from the at least one instance of the application;
   initiate, via the first server of the computing system, a connection of the at least one device and the Internet via a virtual private network (VPN) based on the first request;
   allocate, via the first server of the computing system, a range of Internet Protocol (IP) addresses to the at least one device based on a set of selected digital services being executed on the at least one device, wherein each IP address of the range of IP addresses corresponds to at least one digital service of selected set of digital services executed on the at least one device;
   receive, via the second server, the second request from the application;
   assign, via the second server, at least one IP address from the range of addresses corresponding to the data storage facility associated with the at least one digital service; and
   attempt, via the at least one device, to access the data storage facility associated with the at least one digital service via the at least one IP address, wherein the attempt is routed to the first server of the computing system based on the at least one IP address.

16. The one or more non-transitory computer readable media of claim 15, further comprising execution of the instructions by the processor causes the processor to:
   receiving, via the first server of the computing system, the routed attempt to access the data storage facility associated with the at least one digital service;
   routing, via the first server of the computing system, the at least one device to the data storage facility associated with the at least one digital service;
   capturing, via the computing system, sets of data included in the data storage facility, in response to routing the at least one device to the data storage facility associated with the at least one digital service.

17. The one or more non-transitory computer readable media of claim 16, further comprising execution of the instructions by the processor causes the processor to: tracking, via the computing system, usage of at least one digital service based on the captured sets data from data storage facility associated with the at least one digital service.

18. The one or more non-transitory computer readable media of claim 15, wherein the data storage facility includes a first sub-domain and a second sub-domain, wherein the first sub-domain includes a first set of data from the sets of data and the second sub-domain includes a second set of data from the sets of data.

19. The one or more non-transitory computer readable media of claim 18, further comprising execution of the instructions by the processor causes the processor to: distinguishing, via the computing system, the first sub-domain from the second sub-domain.

20. The one or more non-transitory computer readable media of claim 19, further comprising execution of the instructions by the processor causes the processor to:
   determining, via the computing system, a type of the at least one digital service;
   retrieving, via the computing system, a set of parameters from the database; and
   searching, via the computing system, for instances of the set of parameters in the captured sets of data.

21. The one or more non-transitory computer readable media of claim 15, wherein the digital services are web-applications.

* * * * *